United States Patent Office 2,998,852
Patented Sept. 5, 1961

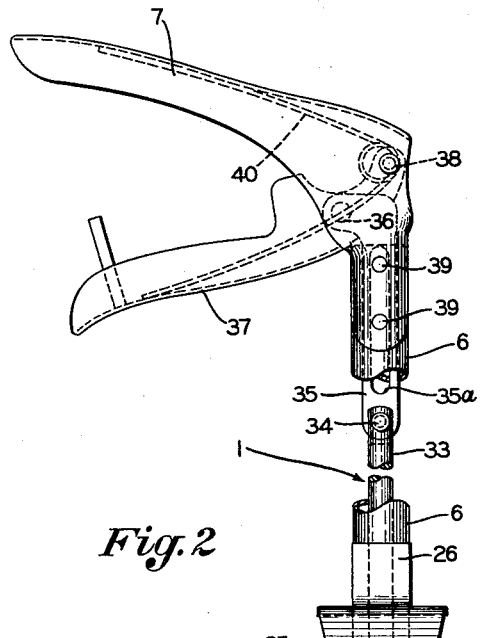
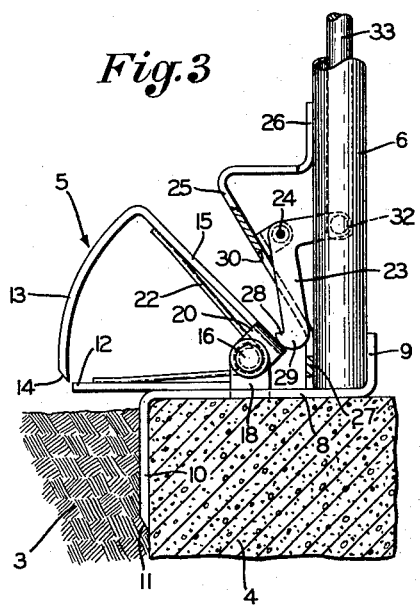
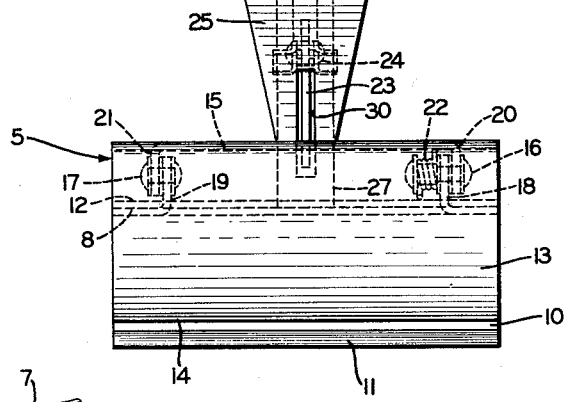
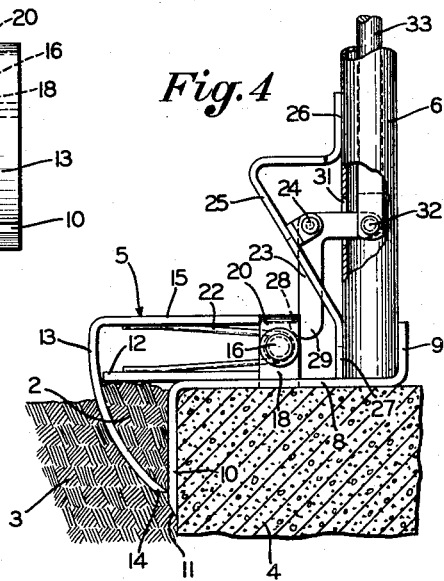
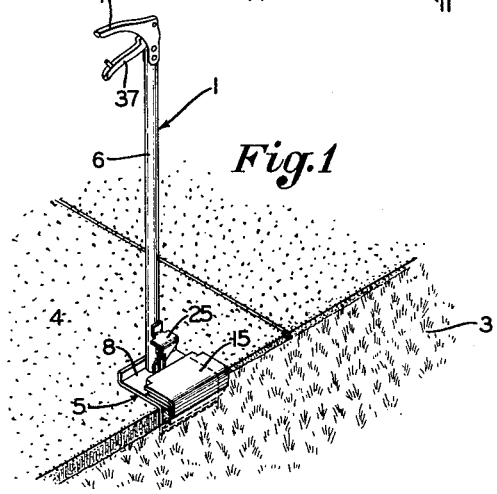
Sept. 5, 1961  J. C. HALL  2,998,852
SIDEWALK EDGER
Filed Feb. 26, 1959
INVENTOR.
John Carl Hall

2,998,852
SIDEWALK EDGER
John Carl Hall, 120 Mohican Ave., Orrville, Ohio
Filed Feb. 26, 1959, Ser. No. 795,757
3 Claims. (Cl. 172—18)

This invention relates to sidewalk edgers and more particularly to a blade for quickly severing and removing a portion of sod from the ground adjacent a sidewalk.

In the past various devices have been used for removing a marginal strip of sod from adjacent a sidewalk. Most of the prior devices have been inadequate for several reasons, including their difficulty of manipulation, their bulky, unwieldy construction, and their failure to remove a similar amount of sod with each successive operation. As a result it has been necessary that the operator exercise considerable care in removing successive segments of sod of equal size and shape in order to assure a neat appearing edge between the grass and the sidewalk.

The device of the present invention overcomes the foregoing difficulties by providing a pivotally mounted blade which is quickly placed in position for cutting and removing successively similar portions of sod. There is no longer a problem of manipulating an unwieldy device into proper alignment with the edge of the sidewalk because the device includes means for alignment with the edge of the sidewalk when once achieved results in an even, straight margin between the sod and the sidewalk.

Accordingly, it is an object of this invention to provide a sidewalk edger which is easy to manipulate.

It is another object of this invention to provide a sidewalk edger which performs successive sod removal operations quickly and accurately.

It is another object of this invention to provide a sidewalk edger which substantially eliminates the difficulties enumerated and obtains the foregoing desiderata in an effective manner.

These and other objects and advantages apparent to those skilled in the art from the following description and claims may be obtained, the stated results achieved, and the described difficulties overcome by the discoveries, principles, apparatus, parts, elements, combinations, and subcombinations which comprise the present invention, the nature of which is set forth in the following general statement, a preferred embodiment of which—illustrative of the best mode in which applicant has contemplated applying the principles—is set forth in the following description and shown in the drawing, and which is particularly and distinctly pointed out and set forth in the appended claims forming part hereof.

The nature of the discoveries and improvements of the present invention may be stated in general terms as including a horizontal alignment plate having a downturned blade adapted for placement on a sidewalk with the blade abutting the vertical side thereof, a cutting blade having a substantially L-shaped configuration and rotatably mounted on an axis parallel to the downturned blade on the plate, the cutting blade being rotatable between a position adjacent the downturned blade and remote therefrom whereby pressure applied to the cutting blade in the remote position drives the cutting blade toward the downturned blade and severs the portion of the sod adjacent the edge of a sidewalk, a wiper bar having an edge adjacent the path of movement of the cutting blade to remove adhering sod from the blade on its return to the remote position from the cutting position, a spring mounted on the cutting blade for holding the latter in the remote position, trigger means for automatically engaging and holding the cutting blade in the cutting position, an upright casing extending from the plate, a gripping handle at the upper end of the casing and spring-biased to an open position, a connecting link between the handle and the trigger means, and the handle having a closed position for releasing the trigger means and permitting the cutting blade to move from the cutting to the remote position.

An embodiment of the invention is illustrated by way of example in the accompanying drawings:

FIGURE 1 is a perspective view of a sidewalk edger shown in position for operation on the edge of a sidewalk;

FIG. 2 is an enlarged elevational view, with a portion broken away, of the sidewalk edger;

FIG. 3 is a sideview, partly in section, of the lower portion of the sidewalk edger with the cutting blade in the raised position; and FIG. 4 is a side view, partly in section, of the lower portion of the sidewalk edger with the cutting blade in the cutting position.

Similar numerals refer to similar parts throughout the several views of the drawings.

In FIG. 1 a sidewalk edger is generally indicated at 1 and positioned for removing a segment of sod 2 (FIG. 4) from soil 3 adjacent a sidewalk 4. The edger 1 includes a cutting portion generally indicated at 5, an upright casing 6, and a handle 7.

As shown in FIGS. 3 and 4, the cutting portion 5 includes a base plate 8 secured to the lower end of the casing 6 in a conventional manner such as by welding. The plate 8 is provided with an upturned flange 9 which reinforces the plate and which is likewise secured to the lower end portion of the casing 6. The plate 8 also includes a downturned flange 10 having a tapered lower end 11 to facilitate insertion of the flange 10 between the sidewalk 4 and the soil 3. As shown in FIGS. 3 and 4, a wiper bar 12 is mounted on the upper side of the plate 8 and is secured thereto in a conventional manner such as by spot welding (not shown).

In addition, the cutting portion 5 includes a cutting blade 13 which is an arcuately shaped member having a tapered lower cutting edge 14 and which extends downwardly from a support member 15. The member 15 is pivotally mounted on the top surface of the plate 8 by spaced pivot pins 16 and 17. The pins 16 and 17 are mounted on pin brackets 18 and 19, respectively, which extend upwardly from the plate 8. The member 15 includes downturned flanges 20 and 21 to which the pins 16 and 17 are attached. As shown in FIGS. 2, 3, and 4, a wire spring 22 is mounted on the pivot pin 16 for holding the cutting blade 13 in the upper non-operative position (FIG. 3).

The cutting portion 5 also includes trigger means for holding the blade 13 in the lower cutting position (FIG. 4) against the force of the wire spring 22 to permit the operator to raise the severed sod 2 from its position adjacent the sidewalk 4 and releasing it into a container. The trigger means includes a trigger 23 which is a bell-crank type lever pivotally mounted at 24 on a pivot support bracket 25, the upper and lower ends of which are secured at 26 and 27 to the lower end portion of the casing 6 in a conventional manner such as by welding (not shown).

The lower end of the trigger 3 includes a trigger or catch surface 28 and a rounded end surface 29. As shown in FIG. 3, the trigger or catch surface 28 extends transversely outwardly from one side of the trigger 23 and engages (FIG. 4) the end portion of the under surface of the member 15 when the blade 13 is lowered to the cutting position, whereby the trigger 23 holds the blade in said position against the force of the spring 22. In all other positions of the blade 13 the rounded end surface 29 of the trigger 23 rides on and over the side and top surfaces of the member 15 as the blade 13 is lowered from the non-operative position of FIG. 3 to the lower operative position of FIG. 4. The portion of the trigger 23 below the pivot 24 preferably extends through an aperture 30 (FIGS. 2 and 3) in the bracket 25.

The other end of the trigger 23 extends through an aperture 31 (FIG. 4) into the interior of the casing 6 where it is pivotally connected at 32 to the lower end of a connecting rod 33 extending to the upper end of the casing 6 where (FIG. 2) the rod is secured at 34 to a link 35, the upper end of which is pivoted at 36 to a handle lever 37 which in turn is pivoted at 38 on the stationary handle 7.

As shown in FIG. 2, the lower portion of the handle 7 is secured by similar spaced rivets 39 to the upper end of the casing 6, which rivets extend through a slot 35a in the link 35 and across the casing 6. The handle lever 37 is maintained in its lowermost position by a wire spring 40. In that position the trigger 23 is spring-biased toward the locking position of FIG. 4 so that as soon as the blade 13 is lowered to its cutting or operative position the trigger 23 automatically moves into the locking position with the trigger or catch surface 28 moving into engagement under the member 15. The trigger 23 is released by raising the handle lever 37 against the force of the spring 40, whereupon the blade 13 is raised to the upper non-operative position of FIG. 3 by the spring 22.

As shown in FIG. 4, the wiper bar 12 extends outwardly from the plate 8 toward the blade 13. In that position the bar 12 functions to wipe the sod 2 from the blade when the trigger 23 is released and the blade is raised by the spring 22 to its upper position.

In operation, the operator places the edger 1 in the position of FIG. 1 by inserting the flange 10 in place against the side of a sidewalk as shown in FIG. 3. The operator then presses the blade downwardly, preferably by his foot, with sufficient force to drive the cutting edge 14 through the soil 3 until the edge comes to a stop in contact with the flange 10. At that position the trigger 23 locks the blade 13 in place so that the edger may be raised from the sidewalk and the cutting portion held over a handy receptacle for release of the sod upon squeezing the handle 7. The operation is then repeated.

Accordingly, the present invention provides an improved sidewalk edger which eliminates prior art difficulties, solves problems which existed in the art, and obtains the described new results not obtained by prior structures. Among other things, the improved sidewalk edger serves the purpose of severing sod from the edge of a sidewalk in a uniform and even manner and removes the sod from its position adjacent the sidewalk without undue exertion on the part of the operator.

In the foregoing description certain terms have been used for brevity, clearness and understanding, but no unnecessary limitations have been implied therefrom as such words are used for descriptive purposes and are intended to be broadly construed.

Moreover, the embodiment of the improved construction illustrated and described herein is by way of example and the scope of the present invention is not limited to the exact construction shown.

Having now described the invention, construction, operation and use of a preferred embodiment thereof and the advantageous, new and useful results obtained thereby; the new and useful sidewalk edger and reasonable mechanical equivalents thereof obvious to those skilled in the art are set forth in the appended claims.

I claim:
1. An edger for removing soil from the side of a sidewalk or the like, comprising a base plate horizontally disposed for placement on a sidewalk, the plate having a downturned flange for abutment with a side of a sidewalk, the flange having a lower tapered edge, a cutting blade pivotally mounted on the plate for movement between an upper non-operative position and a lower operative position, the blade having a cutting edge adjacent the flange in the lower operative position, the blade being spring biased toward the upper non-operative position, the blade also having an edge remote from the cutting edge and movable around the pivotal axis of the blade, trigger means for holding the blade in the lower operative position, an elongated vertical casing mounted on the plate, a handle mounted at the upper end of the casing, the handle having a manually movable portion operatively connected to the trigger means for releasing the trigger means, the trigger means including a lever having a catch surface in the path of rotation of and engageable with the edge of the blade remote from the cutting edge when the blade is in the lower operative position, and the base plate and downturned flange providing two sidewalk abuttable surfaces for steadying the edger and for removing successive segments of sod of uniform configuration.

2. An edger for removing soil from the side of a sidewalk or the like comprising a base plate horizontally disposed for placement on a sidewalk, the plate having a downturned flange for abutment with a side of a sidewalk, a member pivotally mounted on the plate on an axis parallel to the downturned flange and movable between an upper and a lower position, the member being spring-biased toward the upper position, the member having a downturned flange-like blade at a side remote from the pivotal mounting of the member, the blade having a lower cutting edge and having an edge remote from the cutting edge and movable in a path about the pivotal axis of the blade, trigger means for holding the member in the lower position, an upright casing extending from the plate, a handle mounted at the upper end of the casing and having a manually movable portion connected to the trigger means for releasing the trigger means, the trigger means including a lever having a catch surface in the path of rotation of the edge of the member remote from the lower cutting edge and engageable with said last mentioned edge when the member is in the lower position, and the base plate and downturned flange providing two sidewalk abuttable surfaces for steadying the edger and for removing successive segments of sod of uniform configuration.

3. The construction set forth in claim 2 in which a wiper bar is mounted on the plate and extends outwardly beyond the downturned flange to a location adjacent the path of movement of the flange-like blade extending horizontally outwardly from the base plate.

References Cited in the file of this patent

UNITED STATES PATENTS

| | | |
|---|---|---|
| 1,537,537 | Liebscher | May 12, 1925 |
| 1,958,757 | Klingler | May 15, 1934 |
| 2,015,109 | Hays | Sept. 24, 1935 |
| 2,288,957 | Sand | July 7, 1942 |
| 2,787,057 | Bell | Apr. 2, 1957 |

FOREIGN PATENTS

| | | |
|---|---|---|
| 49,583 | Germany | Nov. 8, 1889 |